US011521176B2

(12) United States Patent
Song et al.

(10) Patent No.: US 11,521,176 B2
(45) Date of Patent: Dec. 6, 2022

(54) SERVICE FLOW SYSTEM AND SERVICE DATA PROCESSING METHOD AND APPARATUS

(71) Applicant: Beijing Baidu Netcom Science and Technology Co., Ltd., Beijing (CN)

(72) Inventors: Yuxiao Song, Beijing (CN); Hui Wang, Beijing (CN); Haodong Chen, Beijing (CN); Yao Liu, Beijing (CN); Hang Zhou, Beijing (CN); Weidong Cai, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 480 days.

(21) Appl. No.: 16/675,886

(22) Filed: Nov. 6, 2019

(65) Prior Publication Data
US 2020/0286041 A1 Sep. 10, 2020

(30) Foreign Application Priority Data

Mar. 6, 2019 (CN) .................. 201910168530.X

(51) Int. Cl.
*H04L 9/06* (2006.01)
*G06Q 10/10* (2012.01)
(Continued)

(52) U.S. Cl.
CPC ....... *G06Q 10/103* (2013.01); *G06F 16/1837* (2019.01); *H04L 9/0643* (2013.01); *H04L 67/1044* (2013.01); *H04L 9/50* (2022.05)

(58) Field of Classification Search
CPC ............. G06F 16/1837; G06Q 10/103; H04L 2209/38; H04L 67/1097; H04L 9/0643; H04L 9/3239
See application file for complete search history.

(56) References Cited

U.S. PATENT DOCUMENTS 10,164,973 B1  12/2018 Prasad
2018/0375869 A1  12/2018 Qiu
(Continued)

FOREIGN PATENT DOCUMENTS

CN  107273455 A  10/2017
CN  107566337 A  1/2018
(Continued)

*Primary Examiner* — Mansour Oveissi
(74) *Attorney, Agent, or Firm* — Nixon Peabody LLP

(57) ABSTRACT

Embodiments of the present disclosure relate to a service flow system and a service data processing method and apparatus. The system can include a management server, a distributed storage cluster and a block chain alliance network connected by a network, the block chain alliance network including a consensus node and at least one participant node. Through unified management of a management server, off-chain data is stored in a distributed storage cluster, then participants of each phase are defined for different projects, and the participants of the same phase of the same project share the same on-chain and off-chain data. Therefore, credible access of the participants to block chain data is solved, dynamic customizable phase management of the projects in a service flow is supported, the on-chain data and participants of each phase are strictly divided and managed, and associated management of on-chain and off-chain service flow data is also supported.

17 Claims, 6 Drawing Sheets

(51) Int. Cl.
  *G06F 16/182* (2019.01)
  *H04L 67/104* (2022.01)
  *H04L 9/00* (2022.01)

(56) References Cited

U.S. PATENT DOCUMENTS

| | | |
|---|---|---|
| 2019/0067357 A1 | 2/2019 | Yun-Wei |
| 2019/0109702 A1* | 4/2019 | Maggu .................. G06Q 20/06 |
| 2019/0289454 A1 | 9/2019 | Tetsuo |
| 2020/0089690 A1 | 3/2020 | Honglin |
| 2021/0152357 A1* | 5/2021 | Wang ...................... H04L 9/321 |

FOREIGN PATENT DOCUMENTS

| | | |
|---|---|---|
| CN | 107862215 A | 3/2018 |
| CN | 108289129 A | 7/2018 |
| CN | 108961052 A | 12/2018 |
| CN | 109063169 A | 12/2018 |
| JP | 2018132931 A | 8/2018 |
| KR | 1020180113145 A | 10/2018 |
| KR | 101951408 B1 | 2/2019 |
| WO | WO 2018/066362 A1 | 4/2018 |
| WO | 2018190809 A1 | 10/2018 |

\* cited by examiner

SERVICE FLOW SYSTEM AND SERVICE DATA PROCESSING METHOD AND APPARATUS

CROSS-REFERENCE TO RELATED APPLICATIONS

This application claims priority to Chinese Patent Application No. 201910168530.X, filed with the China National Intellectual Property Administration (CNIPA) on Mar. 6, 2019, the contents of which are incorporated herein by reference in its entirety.

TECHNICAL FIELD

Embodiments of the present disclosure relate to the field of computer technology, and specifically to a service flow system and a service data processing method and apparatus.

BACKGROUND

Block chain technology sequentially connects data blocks in the global consensus order to form a chain data structure, and cryptographically guarantees that the data chain is non-tampering and unforgeable, thereby achieving a globally consistent distributed ledger.

The block chain can implement credible records of relevant data in the existing service flow by participants (e.g., asset holders, law firms, asset auditors, asset trading institutions) involved in the service flow (e.g., asset securitization service flow). In multiple phases of the service flow, the use of block chain technology can ensure the authenticity of service data.

SUMMARY

Embodiments of the application provide a service flow system, a service data processing method and an apparatus.

According to a first aspect, some embodiments of the present disclosure provide a service flow system, the system includes a management server, a distributed storage cluster and a block chain alliance network connected by a network, the block chain alliance network including a consensus node and at least one participant node, where: a participant node is configured to, in response to receiving a first chaining request comprising to-be-chained data, a participated project identity and a participation phase identity, send the first chaining request and participant authentication information of the participant node as a second data chaining request to the management server project; the management server is configured to, in response to a success in verification of the second data chaining request received from the participant node, store the to-be-chained data into the distributed storage cluster; query, in the distributed storage cluster, respective participant information of a phase indicated by a participation phase identity of an project indicated by the participated project identity in the received second data chaining request; determine participant node identities in the queried participant information as a target participant node identity set; send to the consensus node the digest information of the to-be-chained data, the participant node identity of the participant node sending the received second data chaining request, the participated project identity and participation phase identity in the received second data chaining request, and the target participant node identity set as a third chaining request; and record a corresponding relationship between the to-be-chained data stored in the distributed storage cluster and the third chaining request sent to the consensus node; the consensus node is configured to, in response to receiving the third chaining request sent by the management server, store the received third chaining request to a local chaining request buffer pool; select, according to a preset consensus algorithm, a to-be-chained request from the local chaining request buffer pool; and send, for the selected to-be-chained request, data except the target participant identity set in the selected to-be-chained request as a fourth chaining request to participant nodes indicated by respective participant node identities in the target participant identity set in the selected to-be-chained request; the participant nodes are configured to connect, in response to receiving the fourth chaining request sent by the consensus node, the received fourth chaining request to a local block chain.

In some embodiments, the management server is configured to: in response to a success in verification of participant authentication information in the second data chaining request received from the participant node, query in the distributed storage cluster to determine whether participant node identity corresponding to the received participant authentication information is in the participant node identities of the participant information of the phase indicated by the participation phase identity of the project indicated by the received participated project identity; and determine, in response to determining that the participant node identity corresponding to the received participant authentication information is in the participant node identities of the participant information of the phase indicated by the participation phase identity of the project indicated by the received participated project identity, that the second data chaining request received from the participant node succeeds in verification.

In some embodiments, the management server is configured to, in response to receiving a new project creating request comprising to-be-created project information, store the to-be-created project information to the distributed storage cluster, the to-be-created project information comprising an project identity of a to-be-created project and phase information, the phase information being of a number of project phases comprised in the project, the phase information comprising a phase identity and participant information, the participant information being of a number of participants participating in an project phase, and the participant information comprising a participant node identity; determine participant node identities in participant information comprised in respective phase information of the to-be-created project information as a target participant node identity set; send to the consensus node digest information of the to-be-created project information and the target participant node identity set as a third chaining request; and record a corresponding relationship between the to-be-created project information stored in the distributed storage cluster and the third chaining request sent to the consensus node.

In some embodiments, the participant node is configured to query in the local block chain, in response to a success in verification of an on-chain access request including a to-be-accessed on-chain data identity received from a terminal, data corresponding to the to-be-accessed on-chain data identity, and send found data to the terminal.

In some embodiments, the management server is configured to: in response to receiving an off-chain access request sent by a terminal and comprising a to-be-accessed off-chain data identity, a to-be-accessed project identity, a to-be-accessed phase identity and request access participant authentication information, query in the distributed storage cluster to determine whether participant node identity corresponding to received request participant authentication information is in participant node identities of respective participant information of a phase indicated by a to-be-accessed phase identity of an project indicated by the received to-be-accessed project identity; and in response to determining that the participant node identity corresponding to the received request participant authentication information is in the participant node identities of the respective participant information of the phase indicated by the to-be-accessed phase identity of the project indicated by the received to-be-accessed project identity, query, in the distributed storage cluster, data corresponding to the to-be-accessed off-chain data identity, and send found data to the terminal.

According to a second aspect, some embodiments of the present disclosure provides a service data processing method, applied to a management server in a service flow system, where the service flow system includes the management server, a distributed storage cluster and a block chain alliance network connected by a network, the block chain alliance network comprises a consensus node and at least one participant node, and the method includes: storing, in response to a success in verification of a second data chaining request received from a participant node, to-be-chained data into the distributed storage cluster; querying, in the distributed storage cluster, respective participant information of a phase indicated by a participation phase identity of an project indicated by a participated project identity in the received second data chaining request; determining participant node identities in the queried participant information as a target participant node identity set; sending to the consensus node the digest information of the to-be-chained data, the participant node identity of the participant node sending the received second data chaining request, the participated project identity and participation phase identity in the received second data chaining request, and the target participant node identity set as a third chaining request; and recording a corresponding relationship between the to-be-chained data stored in the distributed storage cluster and the third chaining request sent to the consensus node.

In some embodiments, in response to a success in verification of participant authentication information in the second data chaining request received from the participant node, query in the distributed storage cluster to determine whether participant node identity corresponding to the received participant authentication information is in the participant node identities of the participant information of the phase indicated by the participation phase identity of the project indicated by the received participated project identity; and in response to determining that the participant node identity corresponding to the received participant authentication information is in the participant node identities of the participant information of the phase indicated by the participation phase identity of the project indicated by the received participated project identity, determining that the second data chaining request received from the participant node succeeds in verification.

In some embodiments, the method further includes: in response to receiving a new project creating request comprising to-be-created project information, store the to-be-created project information to the distributed storage cluster, the to-be-created project information comprising an project identity of a to-be-created project and phase information, the phase information being of a number of project phases comprised in the project, the phase information comprising a phase identity and participant information, the participant information being of a number of participants participating in an project phase, and the participant information comprising a participant node identity; determining participant node identities in participant information comprised in respective phase information of the to-be-created project information as a target participant node identity set; sending to the consensus node digest information of the to-be-created project information and the target participant node identity set as a third chaining request; and recording a corresponding relationship between the to-be-created project information stored in the distributed storage cluster and the third chaining request sent to the consensus node.

In some embodiments, in response to receiving an off-chain access request sent by a terminal and comprising a to-be-accessed off-chain data identity, a to-be-accessed project identity, a to-be-accessed phase identity and request access participant authentication information, query in the distributed storage cluster to determine whether participant node identity corresponding to received request participant authentication information is in the participant node identities of respective participant information of a phase indicated by a to-be-accessed phase identity of an project indicated by the received to-be-accessed project identity; and in response to determining that the participant node identity corresponding to the received request participant authentication information is in the participant node identities of the respective participant information of the phase indicated by the to-be-accessed phase identity of the project indicated by the received to-be-accessed project identity, querying, in the distributed storage cluster, data corresponding to the to-be-accessed off-chain data identity, and sending found data to the terminal. According to a third aspect, some embodiments of the present disclosure provides a service data processing apparatus, applied to a management server in a service flow system, where the service flow system includes the management server, a distributed storage cluster and a block chain alliance network connected by a network, the block chain alliance network comprises a consensus node and at least one participant node, and the apparatus includes: a first storage unit, configured to store, in response to a success in verification of a second data chaining request received from a participant node, to-be-chained data into the distributed storage cluster; a query unit, configured to query, in the distributed storage cluster, respective participant information of a phase indicated by a participation phase identity of an project indicated by a participated project identity in the received second data chaining request; a first target participant determining unit, configured to determine participant node identities in the queried participant information as a target participant node identity set; a first sending unit, configured to send to the consensus node the digest information of the to-be-chained data, the participant node identity of the participant node sending the received second data chaining request, the participated project identity and participation phase identity in the received second data chaining request, and the target participant node identity set as a third chaining request; and a first recording unit, configured to record a corresponding relationship between the to-be-chained data stored in the distributed storage cluster and the third chaining request sent to the consensus node.

In some embodiments, in response to a success in verification of participant authentication information in the second data chaining request received from the participant node, query in the distributed storage cluster to determine whether participant node identity corresponding to the received participant authentication information is in the participant node identities of the participant information of the phase indicated by the participation phase identity of the project indicated by the received participated project identity; and in response to determining that the participant node identity corresponding to the received participant authentication information is in the participant node identities of the participant information of the phase indicated by the participation phase identity of the project indicated by the received participated project identity, determining that the second data chaining request received from the participant node succeeds in verification.

In some embodiments, the apparatus further includes: a second storage unit, configured to store, in response to receiving a new project creating request comprising to-be-created project information, the to-be-created project information to the distributed storage cluster, the to-be-created project information comprising an project identity of a to-be-created project and phase information, the phase information being of a number of project phases comprised in the project, the phase information comprising a phase identity and participant information, the participant information being of a number of participants participating in an project phase, and the participant information comprising a participant node identity; a second target participant determining unit, configured to determine participant node identities in participant information comprised in respective phase information of the to-be-created project information as a target participant node identity set; a second sending unit, configured to send to the consensus node digest information of the to-be-created project information and the target participant node identity set as a third chaining request; and a second recording unit, configured to record a corresponding relationship between the to-be-created project information stored in the distributed storage cluster and the third chaining request sent to the consensus node.

In some embodiments, the apparatus further includes: a request participant determining unit, configured to: in response to receiving an off-chain access request sent by a terminal and comprising a to-be-accessed off-chain data identity, a to-be-accessed project identity, a to-be-accessed phase identity and request access participant authentication information, query in the distributed storage cluster to determine whether participant node identity corresponding to received request participant authentication information is in the participant node identities of respective participant information of a phase indicated by a to-be-accessed phase identity of an project indicated by the received to-be-accessed project identity; and a third sending unit configured to: in response to determining that the participant node identity corresponding to the received request participant authentication information is in the participant node identities of the respective participant information of the phase indicated by the to-be-accessed phase identity of the project indicated by the received to-be-accessed project identity, querying, in the distributed storage cluster, data corresponding to the to-be-accessed off-chain data identity, and send found data to the terminal.

According to a fourth aspect, some embodiments of the present disclosure provides a server, includes: one or more processors; and a storage apparatus, storing one or more programs, the one or more programs, when executed by the one or more processors, causing the one or more processors to implement the method according to any one of the implementations of the second aspect.

According to a fifth aspect, some embodiments provide a computer-readable storage medium, storing a computer program thereon, wherein the computer program, when executed by one or more processors, causes the processors to implement the method according to any one of the implementations of the second aspect.

Currently, in the service flow data managements, the block chain usually chains all the service data provided by the various participants of the various phases in the service flow, such that various participants of the various phases in the service flow shares identical data, and distinguishing is not performed at the specific projects or participants of the various phases of a project, which leads to a weak mobility and expansibility of technical solutions. Moreover, associated storage of on-chain and off-chain service flow data is not achieved.

The service flow system, service flow data processing method and apparatus provided by some embodiments of the present disclosure, through unified management of a management server, off-chain data is stored in a distributed storage cluster, then participants of each phase are defined for different projects, and the participants of the same phase of the same project share the same on-chain and off-chain data. Therefore, credible access of the participants to block chain data is solved, dynamic customizable phase management of the projects in a service flow is supported, the on-chain data and participants of each phase are strictly divided and managed, and associated management of on-chain and off-chain service flow data is also supported.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

It should be appreciated that the specific embodiments described herein are merely used for explaining the relevant disclosure, rather than limiting the disclosure. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
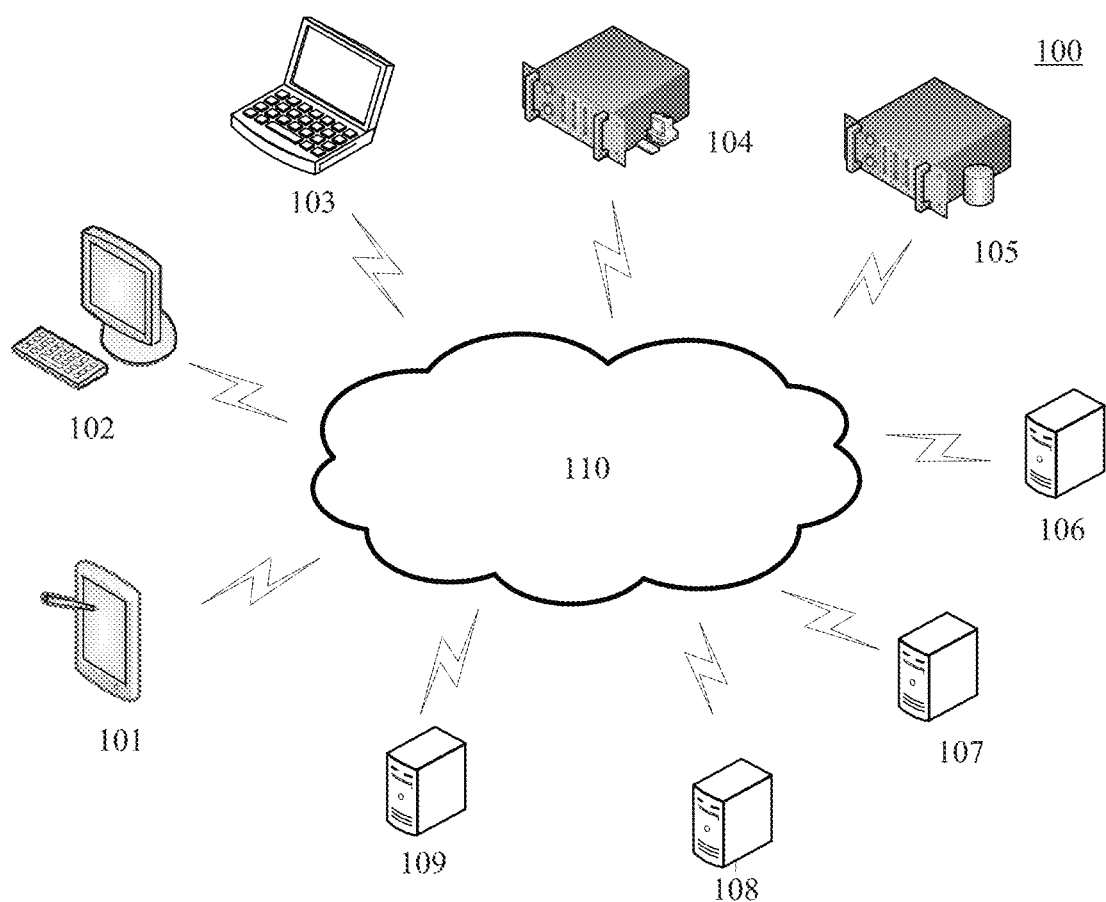
FIG. 1 is an architectural diagram of an example system to which some embodiments of the present disclosure can be applied.

FIG. 1 shows an example system architecture 100 in which a service flow system may be implemented.

As shown in FIG. 1, the system architecture 100 may include participant terminals 101, 102 and 103, a management server 104, a distributed storage cluster 105, a participant node 106 corresponding to the participant terminal 101, a participant node 107 corresponding to the participant terminal 102, a participant node 108 corresponding to the participant terminal 103, a consensus node 109, and a network 110. The network 110 serves as a medium providing a communication link among the participant terminals 101, 102 and 103, the management server 104, the distributed storage cluster 105, the participant nodes 106, 107 and 108, and the consensus node 109. The network 110 may include various types of connections, such as wired or wireless communication links, or optical fiber cables. The participant nodes 106, 107 and 108 and the consensus node 109 constitute a block chain alliance network, also called an alliance chain.

A user can use the participant terminal 101, 102 or 103 to interact with the management server 104 over the network 110, to receive or send messages, etc. The participant terminals 101, 102 and 103 may be installed with various client applications, such as social network management applications, shopping website management applications, web browser applications, shopping applications, search applications, instant messaging tools, e-mail clients, and social platform software.

The user can also interact with the participant node 106 over the network 110 using the participant terminal 101, or interact with the participant node 107 over the network 110 using the participant terminal 102, or interact with the participant node 108 over the network 110 using the participant terminal 103.

The participant terminals 101, 102 and 103 may be hardware or software. When the participant terminals 101, 102 and 103 are hardware, the participant terminals may be various electronic devices, including but not limited to a smart phone, a tablet computer, a laptop computer, a desktop computer, etc. When the participant terminals 101, 102 and 103 are software, the participant terminals may be installed in the above-listed electronic devices. The participant terminals may be implemented as a plurality of software programs or software modules (e.g., for providing distributed services), or as a single software program or software module. Specific limitations are not provided here.

The management server 104 may be a server providing various services, such as providing a support for a data processing request sent by the participant terminal 101, 102 or 103. The management server may analyze the received data such as a data chaining request or a data access request, and feed the processing result (for example, the data chaining result or the accessed data) back to the participant terminal.

It should be noted that the management server 104 may be hardware or software. When the management server 104 is hardware, the management server 104 may be implemented as a distributed server cluster composed of multiple servers, or as a single server. When the management server 104 is software, the management server 104 may be implemented as a plurality of software programs or software modules (e.g., for providing a data management service), or as a single software program or software module. Specific limitations are not provided herein.

The distributed storage cluster 105 may be a server cluster providing services such as distributed data storage, deletion, modification or query, for example, a distributed database server cluster providing a support for a data manipulation request sent by the management server 104. The distributed storage cluster 105 may process, i.e. analyze, the received data such as the data manipulation request, and feed the processing result (for example, the data manipulation result) back to the management server 104.

It should be noted that the distributed storage cluster 105 may be hardware or software. When the distributed storage cluster 105 is hardware, the distributed storage cluster 105 may be implemented as a distributed server cluster composed of multiple servers, or as a single server. When the distributed storage cluster 105 is software, the distributed storage cluster 105 may be implemented as a plurality of software programs or software modules (e.g., for providing a distributed data service), or as a single software program or software module. Specific limitations are not provided herein.

The participant nodes 106, 107 and 108 may be electronic devices that provide data block generation and storage services in a block chain and provide a block chain data query service. For example, generating a block for the digest information of to-be-chained data sent from the consensus node 109 and a participant node identity of the corresponding participant node that sends the to-be-chained data, and the generated block is connected to a local block chain.

The participant node 106, 107 or 108 may be hardware or software. When the participant node 106, 107 or 108 is hardware, the participant node may be implemented as a distributed server cluster composed of multiple servers, or as a single server. When the participant node 106, 107 or 108 is software, the participant node may be implemented as a plurality of software programs or software modules (e.g., for providing a block chain service), or as a single software program or software module. Specific limitations are not provided here.

The consensus node 109 may provide consensus services in the block chain. For example, the consensus node 109 may cache the data chaining request received from the management server, and selects a data chaining request according to a preset consensus algorithm to send to the corresponding participant node, to perform a data chaining operation.

It should be noted that the data processing method according to some embodiments of the present disclosure is generally executed by the management server 104. Accordingly, the data processing apparatus based on a block chain is generally provided in the management server 104.

It should be understood that the numbers of the participant terminals, the management server, the distributed storage cluster, the participant nodes, the consensus node, and the network in FIG. 1 are merely illustrative. Any number of participant terminals, management servers, distributed storage clusters, participant nodes, consensus nodes, and networks may be provided based on actual requirements.

Figure 2:
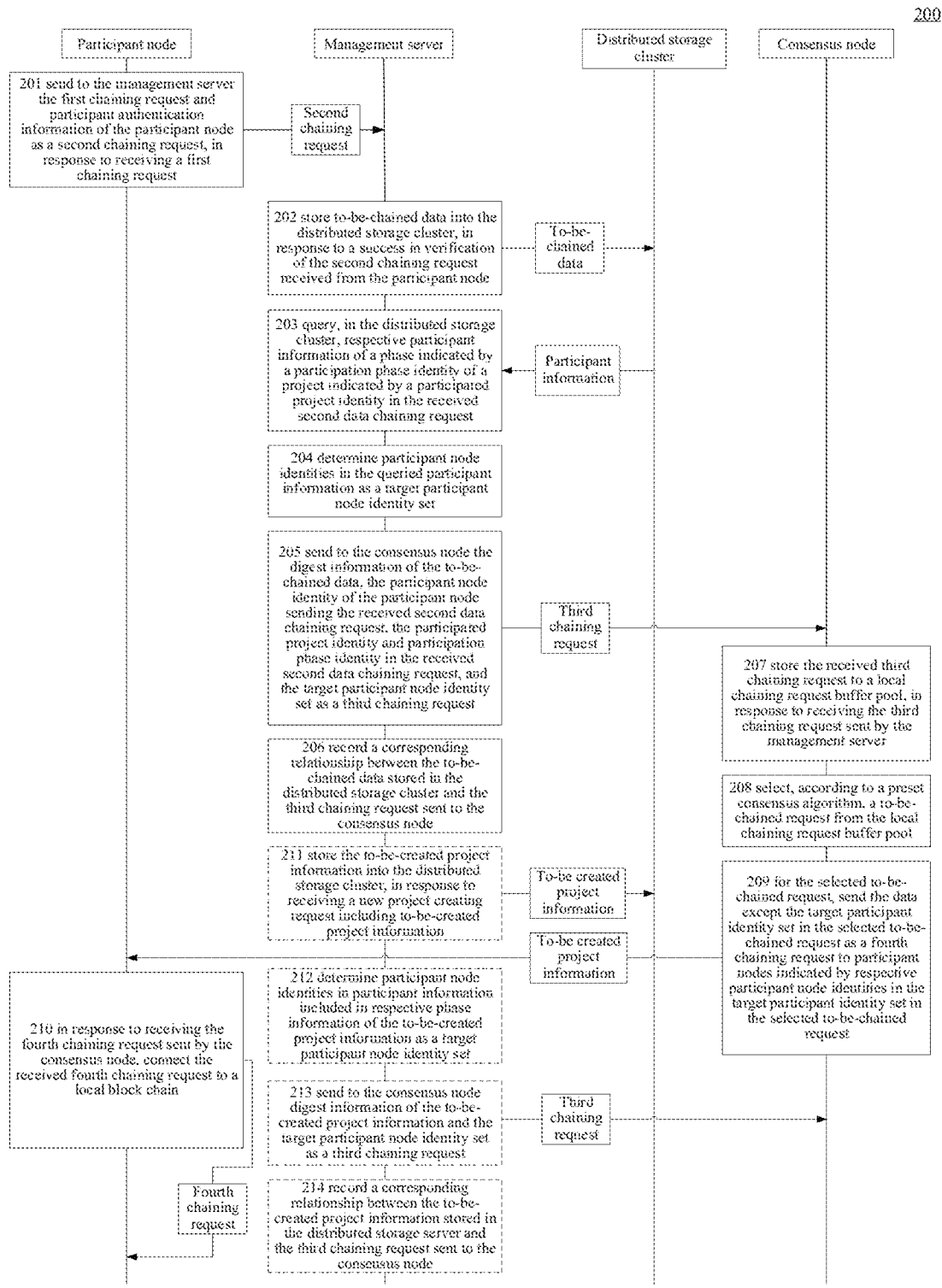
FIG. 2 is a sequence diagram of a service flow system according to an embodiment of the present disclosure.

Further, referring to FIG. 2, a sequence 200 of a service flow system according to an embodiment of the present disclosure is shown.

The service flow system in some embodiments of the present disclosure may include a management server, a distributed storage cluster and a block chain alliance network connected by a network, where the block chain alliance network may include a consensus node and at least one participant node.

As shown in FIG. 2, the sequence 200 of a service flow system according to an embodiment of the present disclosure may include the following steps.

Step 201, a participant node sends, in response to receiving a first chaining request, the first chaining request and participant authentication information of the participant node as a second data chaining request to a management server.

In the present embodiment, in response to receiving the first chaining request including to-be-chained data, a participated project identity and a participation phase identity, the participant node may send the received first chaining request and the participant authentication information of the participant node as the second data chaining request to the management server.

The to-be-chained data may be various data related to various service flows to which the service flow system is applied. For example, when the service flow system is applied to an asset securitization flow system, the to-be-chained data may be project information of an asset securitization project, asset information (e.g., real estate information or vehicle information, etc.) of an asset holder, a lawyer's letter of a law firm, an audit result of an audit institution, a notarization result of a notary authority, or a trading record of an asset trading institution, etc.

The participation project identity in the first chaining request may be an project identity of an project in which the participant corresponding to the participant node participates. The participation phase identity in the first chaining request may be a phase identity of a phase of the project in which the participant corresponding to the participant node participates.

In the present embodiment, a participant may participate in at least one of a plurality of phases of a certain project. In other words, in the present embodiment, a user may customize projects of a service flow, where each project may include at least one phase, and in each phase at least one participant participating in the phase may be customized.

Herein, the first chaining request may be the one input by the user, received by a participant terminal and sent to the participant node. Of course, the first chaining request may also be the one input by the user and directly received by the participant node.

Step 202, in response to a success in verification of the second chaining request received from the participant node, the management server stores the to-be-chained data into a distributed storage cluster.

In the present embodiment, in response to receiving the second chaining request sent by the participant node, the management server may verify the received second chaining request. If the verification succeeds, the management server stores the to-be-chained data in the received second chaining request into the distributed storage cluster.

In some optional implementations of the present embodiment, when the participant authentication information in the received second chaining request succeeds in verification, the management server may determine that the second chaining request received from the participant node succeeds in verification.

In some optional implementations of the present embodiment, when the participant authentication information in the received second chaining request succeeds in verification, the management server may further query in the distributed storage cluster to determine whether the participant node identity corresponding to the participant authentication information in the received second chaining request is in the participant node identities of respective participant information of a phase indicated by a participation phase identity of an project indicated by the received participated project identity; if yes, the management server may determine that the second chaining request received from the participant node succeeds in verification. That is, if it is queried in the distributed storage cluster that the participant node identity corresponding to the participant authentication information in the received second chaining request is in the participant node identities of respective participant information of the phase indicated by the participation phase identity of the project indicated by the received participated project identity, it indicates that the participant corresponding to the participant authentication information in the received second chaining request participates in the phase indicated by the participation phase identity of the project indicated by the participated project identity in the received second chaining request. That is to say, the participant sending the received second chaining request participates in the phase indicated by the participation phase identity of the project indicated by the participated project identity, the management server may determine that the received second chaining request succeeds in verification.

Here, the participant authentication information of the participant node may be identity information for characterizing the participant node and corresponding authentication information in various forms. For example, the participant authentication information of the participant node may include a participant identity and a participant password. For another example, the participant authentication information of the participant may further include a digital credit certificate of the participant issued by the management server. It should be noted that the management server may acquire the authenticated participant authentication information of each participant locally or from the distributed storage cluster, and verify the authentication information of the participant node based on the acquired authenticated participant authentication information.

Step 203, the management server queries, in the distributed storage cluster, respective participant information of a phase indicated by a participation phase identity of an project indicated by the participated project identity in the received second data chaining request.

In the present embodiment, project information of each project may be pre-stored in the distributed storage cluster, the project information may include an project identity and phase information, the phase information being of the number of project phases included in the project, the phase information may include a phase identity and participant information, the participant information being of the number of participants of the project phase, and the participant information may include a participant node identity. In this way, the management server may query, in the distributed storage cluster, the participant information of the phase indicated by the participation phase identity of the project indicated by the participated project identity in the received second data chaining request.

Step 204, the management server determines participant node identities in the queried participant information as a target participant node identity set.

In the present embodiment, the management server may determine the participant node identities in the participant information queried in step 203 as a target participant node identity set.

Step 205, the management server sends to a consensus node the digest information of the to-be-chained data, the participant node identity of the participant node that sends the received second data chaining request, the participated project identity and participation phase identity in the received second data chaining request, and the target participant node identity set as a third chaining request.

In the present embodiment, the management server may first generate the digest information of the to-be-chained data in the second chaining request received from the participant node in step 202 by using various digest generation methods. For example, the digest generation methods may include, but are not limited to, a message-digest algorithm (MD5), a SHA256 algorithm, etc. Then, the management server may send to the consensus node the generated digest information, the participant node identity of the participant node that sends the received second data chaining request, the participated project identity and participation phase identity in the received second data chaining request, and the target participant node identity set determined in step 204 as a third chaining request.

Step 206, the management server records a corresponding relationship between the to-be-chained data stored in the distributed storage cluster and the third chaining request sent to the consensus node.

In the present embodiment, the management server records the corresponding relationship between the to-be-chained data stored in the distributed storage cluster and the third chaining request sent to the consensus node, so that the management server can achieve associated interaction of data on chain and off chain.

Since the space of each participant node on chain is limited, the original data of the to-be-chained data is stored in the off-chain distributed storage cluster in order to save the on-chain storage space. The digest information of the to-be-chained data greatly reduces the demand for the storage space compared to the original data, so that the on-chain storage space can be saved by storing the digest information of the to-be-chained data to each participant node on chain. However, sometimes a participant desires to access the original data of the to-be-chained data corresponding to the chained digest information. In order to be able to access the original data correspondingly, associated interaction of data on chain and off chain may be achieved based on the corresponding relationship recorded by the management server.

Step 207, in response to receiving the third chaining request sent by the management server, the consensus node stores the received third chaining request to a local chaining request buffer pool.

Step 208, the consensus node selects, according to a preset consensus algorithm, a to-be-chained request from the local chaining request buffer pool.

In the present embodiment, the preset consensus algorithm is used to sort to-be-chained requests in the chaining request buffer pool stored locally by the consensus node and select to-be-chained requests meet a condition. For example, the to-be-chained requests may be sorted according to the time of being stored to the chaining request buffer pool, and a first preset number of to-be-chained requests stored earliest may be selected. For another example, the to-be-chained requests may be sorted according to the occupation of the storage space in the chaining request buffer pool, and then a plurality of to-be-chained requests requiring a total storage space within a preset storage space range are selected.

Step 209, the consensus node sends, for the selected to-be-chained request, data except the target participant identity set in the selected to-be-chained request as a fourth chaining request to participant nodes indicated by respective participant node identities in the target participant identity set in the selected to-be-chained request.

In the present embodiment, the consensus node may first acquire, for each selected to-be-chained request, data except the target participant identity set in the to-be-chained request as a fourth chaining request, and then send the fourth chaining request to the participant nodes indicated by the respective participant node identities in the target participant identity set in the to-be-chained request.

Step 210, in response to receiving the fourth chaining request sent by the consensus node, the participant nodes connect the received fourth chaining request to a local block chain.

In the present embodiment, in response to receiving the fourth chaining request sent by the consensus node, the participant node may generate a block for the received fourth chaining request, and connects the generated block to the local block chain.

How to generate a block is an existing technology widely studied and applied, and details are not described herein again. For example, a Merkle tree of the received fourth chaining request may be first generated as block body data for the received fourth chaining request by using Merkle tree technology, then block header data is generated using a hash value of last block, a random number generated randomly, the received fourth chaining request and roots of the generated Merkle tree, and finally the block header data and the block body data are combined to obtain a block. Of course, optionally, the block header may further include a time stamp value of the time when the block is generated.

It can be understood that, when the each participant node indicated by each of the target participant identities in the target participant identity set determined in step 209 receives the fourth chaining request and connects the received fourth chaining request to the local block chain, the participant nodes indicated by target participant identities in the target participant identity set store the same fourth chaining request block content. In other words, the participant nodes of respective participants participating in the same phase of the same project save all chained data related to the same phase of the same project.

In some optional implementation manners of the present embodiment, the above sequence 200 may further include step 211 to step 214 below.

Step 211, in response to receiving a new project creating request including to-be-created project information, the management server stores the to-be-created project information to the distributed storage cluster.

The management server may store, when receiving the new project creating request including to-be-created project information, the to-be-created project information into the distributed storage cluster. The to-be-created project information may include an project identity of the to-be-created project and phase information, the phase information being of the number of project phases included in the project, the phase information may include a phase identity and participant information, the participant information being of the number of participants participating in an project phase, and the participant information may include a participant node identity.

The project identity is used to uniquely indicate an project, for example, the project identity may be in the form of increasing serial number, or in the form of a name of the project. The phase identity is used to uniquely indicate a phase in the project, for example, the phase identity may be in the form of increasing serial number, or in the form of a name of the phase.

In practice, besides the participant node identity, the participant information may include a participant name, a participant type, etc.

Step 212, the management server determines participant node identities in participant information included in respective phase information of the to-be-created project information as a target participant node identity set.

Step 213, the management server sends to the consensus node digest information of the to-be-created project information and the target participant node identity set as a third chaining request.

In this way, the consensus node can perform steps 207-209, and the participant nodes can perform step 210, to chain the digest information of the to-be-created project information into the participation nodes of participants participating in respective phases of the project indicated by the to-be-created project information.

Step 214, the management server records a corresponding relationship between the to-be-created project information stored in the distributed storage cluster and the third chaining request sent to the consensus node.

The system provided by the above embodiments of the present disclosure, through unified management of a management server, off-chain data is stored in a distributed storage cluster, then participants of each phase are defined for different projects, and the participants of the same phase of the same project share the same on-chain and off-chain data. Therefore, credible access of the participants to block chain data is solved, dynamic customizable phase management of the projects in a service flow is supported, the on-chain data and participants of each phase are strictly divided and managed, and associated management of on-chain and off-chain service flow data is also supported.

Figure 3:
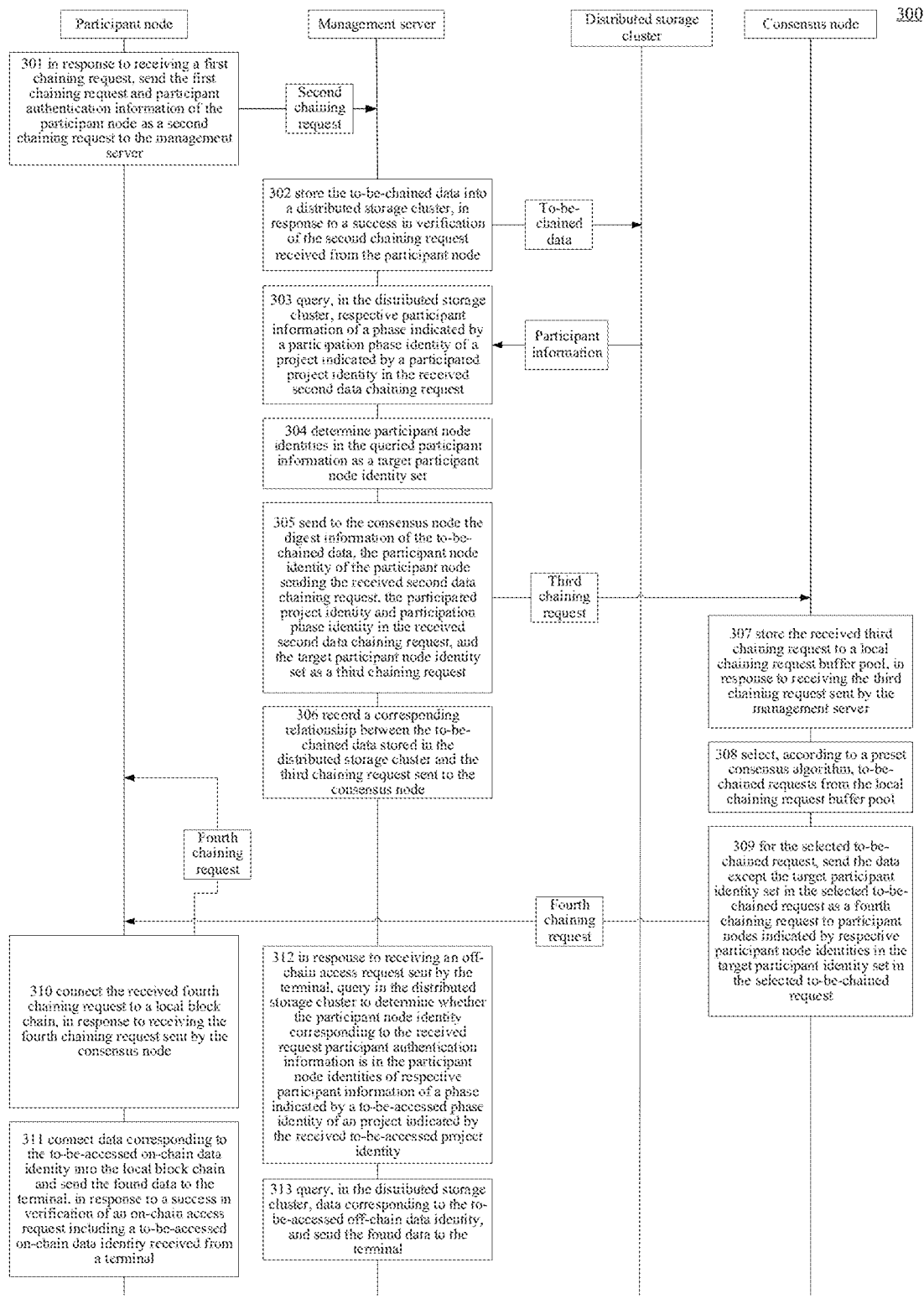
FIG. 3 is a sequence diagram of the service flow system according to another embodiment of the present disclosure.

Further, refer to FIG. 3, which shows a sequence 300 of another embodiment of the service flow system.

The service flow system in some embodiments of the present disclosure may include a management server, a distributed storage cluster and a block chain alliance network connected by a network, where the block chain alliance network may include a consensus node and at least one participant node.

As shown in FIG. 3, the sequence 300 of the service flow system according to another embodiment of the present disclosure may include the following steps.

Step 301, a participant node sends, in response to receiving a first chaining request, the first chaining request and participant authentication information of the participant node as a second chaining request to a management server.

Step 302, in response to a success in verification of the second chaining request received from the participant node, the management server stores the to-be-chained data into a distributed storage cluster.

Step 303, the management server queries, in the distributed storage cluster, respective participant information of a phase indicated by a participation phase identity of an project indicated by the participated project identity in the received second data chaining request.

Step 304, the management server determines participant node identities in the queried participant information as a target participant node identity set.

Step 305, the management server sends to a consensus node the digest information of the to-be-chained data, the participant node identity of the participant node that sends the received second data chaining request, the participated project identity and participation phase identity in the received second data chaining request, and the target participant node identity set as a third chaining request.

Step 306, the management server records a corresponding relationship between the to-be-chained data stored in the distributed storage cluster and the third chaining request sent to the consensus node.

Step 307, in response to receiving the third chaining request sent by the management server, the consensus node stores the received third chaining request to a local chaining request buffer pool.

Step 308, the consensus node selects, according to a preset consensus algorithm, a to-be-chained request from the local chaining request buffer pool.

Step 309, the consensus node sends, for the selected to-be-chained request, data except the target participant identity set in the selected to-be-chained request as a fourth chaining request to participant nodes indicated by respective participant node identities in the target participant identity set in the selected to-be-chained request.

Step 310, in response to receiving the fourth chaining request sent by the consensus node, the participant nodes connect the received fourth chaining request to a local block chain.

In the present embodiment, the specific operations of steps 301-310 are substantially the same as the operations of steps 201-210 in the embodiment shown in FIG. 2, and details are not described herein again.

Step 311, in response to a success in verification of an on-chain access request including a to-be-accessed on-chain data identity received from a terminal, the participant node queries in the local block chain the data corresponding to the to-be-accessed on-chain data identity, and sends the found data to the terminal.

In the present embodiment, when receiving the on-chain access request including a to-be-accessed on-chain data identity received from the terminal, the participant node may query in the local block chain the data corresponding to the to-be-accessed on-chain data identity, and sends the found data to the terminal. Since the participant node is a node in the alliance chain, the participant node is only opened to the terminal of the participant corresponding to the participant node. The on-chain access request received by the participant node from the terminal is sent by a participant corresponding to the participant node using the terminal, and the on-chain data stored in the local block chain node of the participant node is data of participated phases in each project in which the participant corresponding to the participant node participates, so the participant node can directly query in the local block chain the data corresponding to the to-be-accessed on-chain data identity, and send the found data to the terminal.

That is, the participant can be connected to the participant node through the terminal to implement on-chain data access.

Step 312, in response to receiving an off-chain access request sent by the terminal, the management server query in the distributed storage cluster to determine whether the participant node identity corresponding to the received request participant authentication information is in the participant node identities of respective participant information of a phase indicated by a to-be-accessed phase identity of an project indicated by the received to-be-accessed project identity.

In the present embodiment, when receiving the off-chain access request including a to-be-accessed off-chain data identity, a to-be-accessed project identity, a to-be-accessed phase identity and request access participant authentication information, the management server may first query in the distributed storage cluster a participant node identity in participant information of a phase indicated by the to-be-accessed phase identity of the project indicated by the received to-be-accessed project identity. Then, the management server determines whether the participant node identity corresponding to the received request participant authentication information is in the determined participant node identities. If yes, the procedure proceeds to step 313. That is, if it is determined that the participant node identity corresponding to the received request participant authentication information is in the determined participant node identities, it indicates that the participant corresponding to the request access participant authentication information participates in the phase indicated by the to-be-accessed phase identity of the project indicated by the to-be-accessed project identity, the participant corresponding to the request access participant authentication information has the right to access the data indicated by the to-be-accessed off-chain data identity.

Step 313, the management server queries in the distributed storage cluster the data corresponding to the to-be-accessed off-chain data identity, and sends the found data to the terminal.

In the present embodiment, when determining in step 312 that the participant corresponding to the request access participant authentication information has the right to access the data indicated by the to-be-accessed off-chain data identity, the management server may query in the distributed storage cluster the data corresponding to the to-be-accessed off-chain data identity, and sends the found data to the terminal.

In some optional implementation manners of the present embodiment, the sequence 300 may also include steps 211 to 214 shown in FIG. 2 (not shown).

It may be seen from FIG. 3 that, compared with the corresponding embodiments of FIG. 2, the sequence 300 of the service flow system in the present embodiment adds the steps of accessing off-chain data and accessing on-chain data. Therefore, the solution described in the present embodiment can implement the operations of accessing the off-chain original data and the on-chain digest information of the service flow system.

Figure 4:
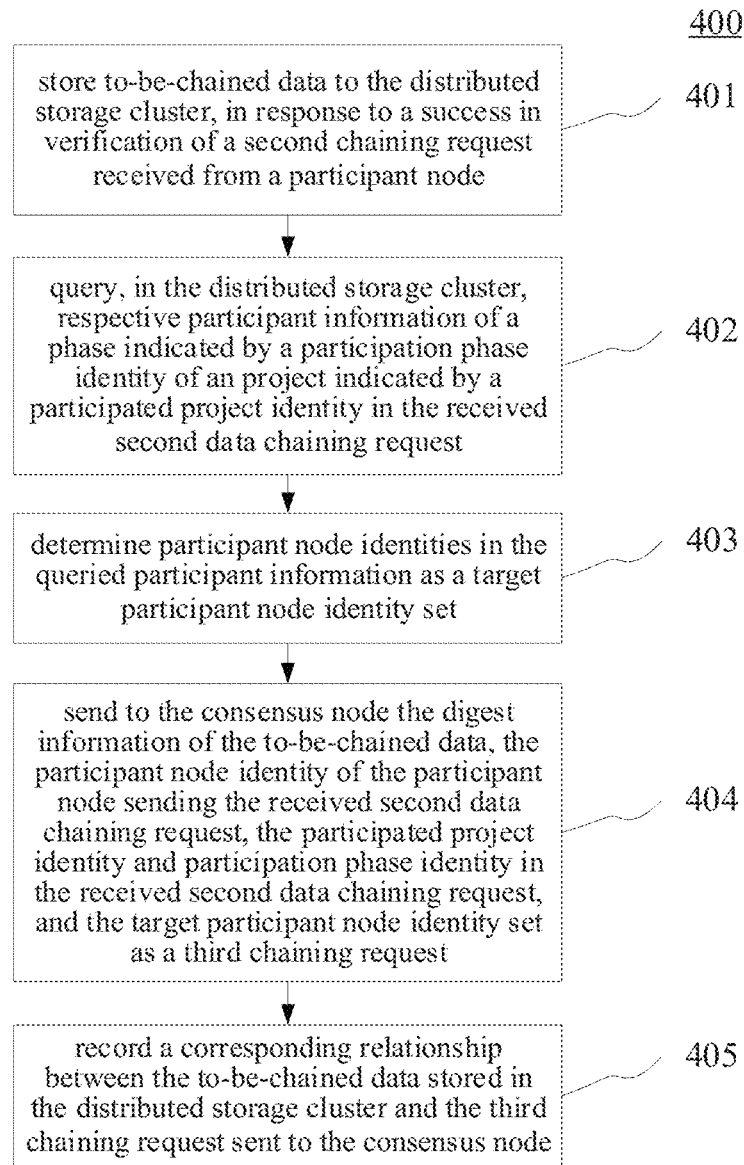
FIG. 4 is a flowchart of a data processing method according to an embodiment of the present disclosure.

Referring to FIG. 4, a flow 400 of an embodiment of a service data processing method is shown, applied to a management server in a service flow system. The service flow system may include a management server, a distributed storage cluster and a block chain alliance network connected by a network, where the block chain alliance network may include a consensus node and at least one participant node. The flow 400 of the service data processing method includes the following steps.

Step 401: in response to a success in verification of a second chaining request received from a participant node, storing to-be-chained data to the distributed storage cluster.

In the present embodiment, the specific operation of step 401 is substantially the same as the operation of step 202 in the embodiment shown in FIG. 2, and details are not described herein again.

Step 402: querying, in the distributed storage cluster, respective participant information of a phase indicated by a participation phase identity of an project indicated by the participated project identity in the received second data chaining request.

In the present embodiment, the specific operation of step 402 is substantially the same as the operation of step 203 in the embodiment shown in FIG. 2, and details are not described herein again.

Step 403: determining participant node identities in the queried participant information as a target participant node identity set.

In the present embodiment, the specific operation of step 403 is substantially the same as the operation of step 204 in the embodiment shown in FIG. 2, and details are not described herein again.

Step 404, sending to the consensus node the digest information of the to-be-chained data, the participant node identity of the participant node that sends the received second data chaining request, the participated project identity and participation phase identity in the received second data chaining request, and the target participant node identity set as a third chaining request.

In the present embodiment, the specific operation of step 404 is substantially the same as the operation of step 205 in the embodiment shown in FIG. 2, and details are not described herein again.

Step 405: recording a corresponding relationship between the to-be-chained data stored in the distributed storage cluster and the third chaining request sent to the consensus node.

In the present embodiment, the specific operation of step 405 is substantially the same as the operation of step 206 in the embodiment shown in FIG. 2, and details are not described herein again.

The service data processing method provided by some embodiments of the present disclosure, through unified management of a management server, off-chain data is stored in a distributed storage cluster, then participants of each phase are defined for different projects, and the participants of the same phase of the same project share the same on-chain and off-chain data. Therefore, credible access of the participants to block chain data is solved, dynamic customizable phase management of the projects in a service flow is supported, the on-chain data and participants of each phase are strictly divided and managed, and associated management of on-chain and off-chain service flow data is also supported.

Figure 5:
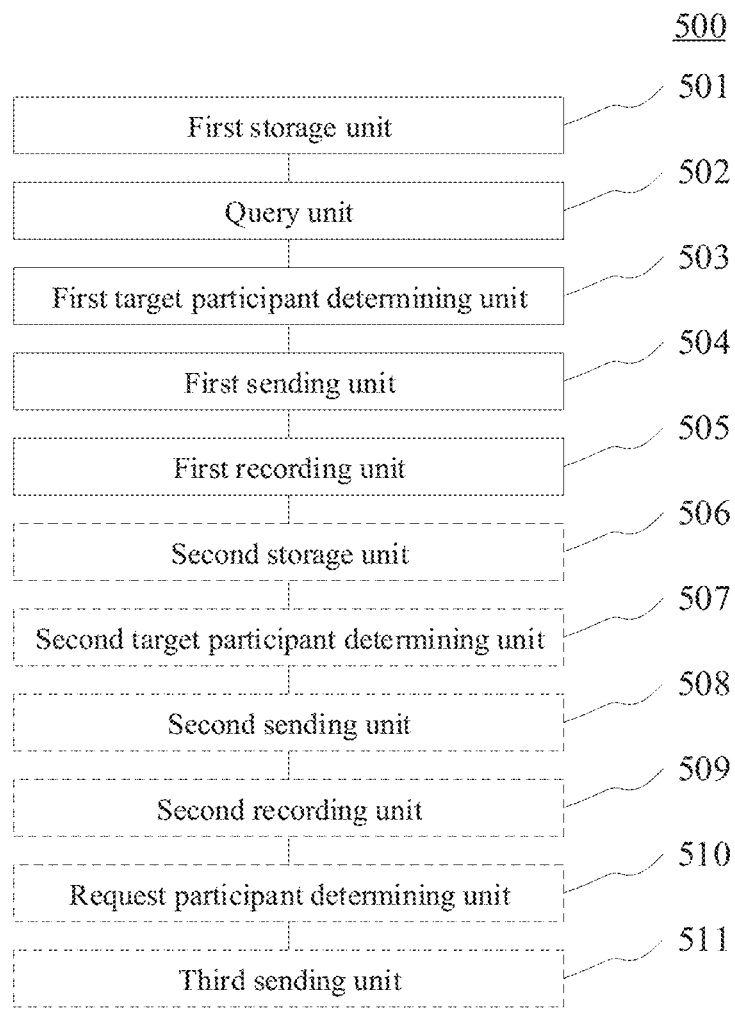
FIG. 5 is a schematic structural diagram of a data processing apparatus according to an embodiment of the present disclosure.

Further referring to FIG. 5, as an implementation of the method shown in the above figures, some embodiments of the present disclosure provide a service data processing apparatus, applied to a management server in a service flow system, where the service flow system includes a management server, a distributed storage cluster and a block chain alliance network connected by a network, and the block chain alliance network includes a consensus node and at least one participant node. The embodiment of the apparatus corresponds to the embodiment of the method shown in FIG. 4, and the apparatus may be applied to various electronic devices.

As shown in FIG. 5, the service data processing apparatus 500 of the present embodiment includes a first storage unit 501, a query unit 502, a first target participant determining unit 503, a first sending unit 504, and a first recording unit 505. The first storage unit 501 is configured to store, in response to success in verification of a second chaining request received from a participant node, to-be-chained data into the distributed storage cluster; the query unit 502 is configured to query, in the distributed storage cluster, respective participant information of a phase indicated by a participation phase identity of an project indicated by a participated project identity in the received second data chaining request; the first target participant determining unit 503 is configured to determine participant node identities in the queried participant information as a target participant node identity set; the first sending unit 504 is configured to send to the consensus node the digest information of the to-be-chained data, the participant node identity of the participant node sending the received second data chaining request, the participated project identity and participation phase identity in the received second data chaining request, and the target participant node identity set as a third chaining request; the first recording unit 505 is configured to record a corresponding relationship between the to-be-chained data stored in the distributed storage cluster and the third chaining request sent to the consensus node.

In the present embodiment, the specific processing of the first storage unit 501, the query unit 502, the first target participant determining unit 503, the first sending unit 504, and the first recording unit 505 of the service data processing apparatus 500 and the technical effects thereof may be referred to the related description in step 201, step 202, step 203, step 204, and step 205 in the corresponding embodiment of FIG. 2, respectively. The description will not be repeated here.

In some optional implementations of the present embodiment, the response to a success in verification of a second chaining request received from a participant node may include: in response to success in verification of participant authentication information in the second chaining request received from the participant node, query in the distributed storage cluster to determine whether participant node identity corresponding to the received participant authentication information is in the participant node identities of the participant information of the phase indicated by the participation phase identity of the project indicated by the received participated project identity; and in response to determining that the participant node identity corresponding to the received participant authentication information is in the participant node identities of the participant information of the phase indicated by the participation phase identity of the project indicated by the received participated project identity, determining that the second chaining request received from the participant node succeeds in verification.

In some optional implementations of the present embodiment, the apparatus 500 may further include: a second storage unit 506 configured to store, in response to receiving a new project creating request including to-be-created project information, the to-be-created project information to the distributed storage cluster, the to-be-created project information including an project identity of a to-be-created project and phase information, the phase information being of the number of project phases included in the project, the phase information including a phase identity and participant information, the participant information being of the number of participants participating in an project phase, and the participant information including a participant node identity; a second target participant determining unit 507 configured to determine participant node identities in participant information included in respective phase information of the to-be-created project information as a target participant node identity set; a second sending unit 508 configured to send to the consensus node digest information of the to-be-created project information and the target participant node identity set as a third chaining request; and a second recording unit 509 configured to record a corresponding relationship between the to-be-created project information stored in the distributed storage cluster and the third chaining request sent to the consensus node.

In some optional implementations of the present embodiment, the apparatus 500 may further include: a request participant determining unit 510 configured to: in response to receiving an off-chain access request sent by the terminal and comprising a to-be-accessed off-chain data identity, a to-be-accessed project identity, a to-be-accessed phase identity and request access participant authentication information, query in the distributed storage cluster to determine whether participant node identity corresponding to received request participant authentication information is in the participant node identities of respective participant information of a phase indicated by a to-be-accessed phase identity of an project indicated by the received to-be-accessed project identity; and a third sending unit 511 configured to: in response to determining that the participant node identity corresponding to the received request participant authentication information is in the participant node identities of the respective participant information of the phase indicated by the to-be-accessed phase identity of the project indicated by the received to-be-accessed project identity, querying, in the distributed storage cluster, data corresponding to the to-be-accessed off-chain data identity, and send the found data to the terminal.

It should be noted that the implementation details of the units in the service data processing apparatus provided by some embodiments of the present disclosure and the and technical effects thereof may be referred to the descriptions of other embodiments in the present disclosure, and details are not described herein again.

Figure 6:
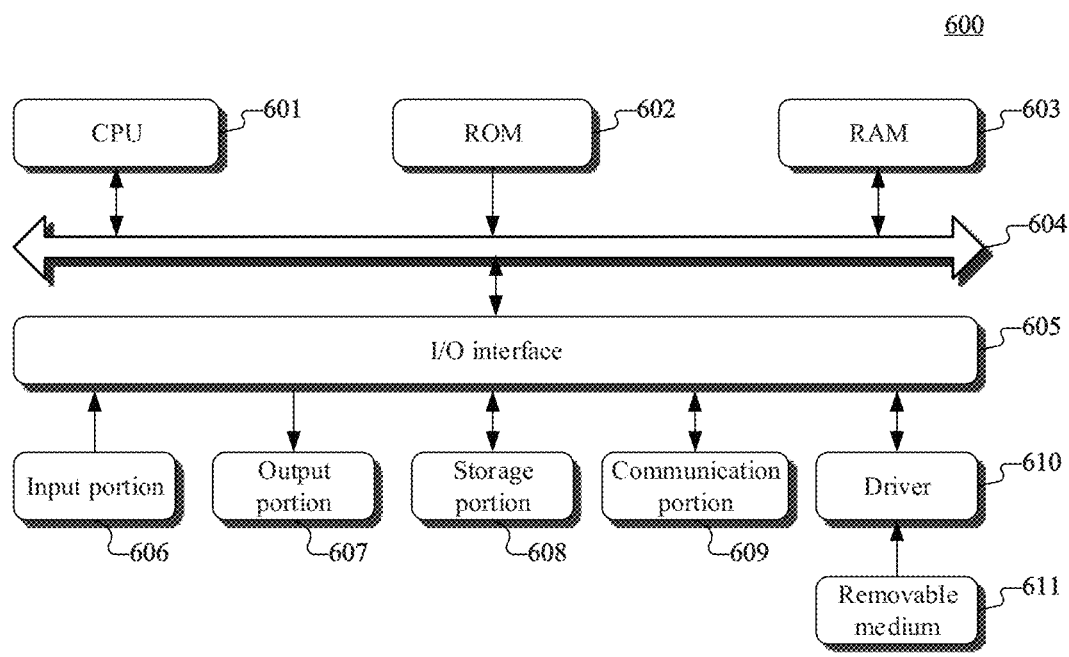
FIG. 6 is a schematic structural diagram of a computer system of a server adapted to implement some embodiments of the present disclosure.

Referring to FIG. 6, a schematic structural diagram of a computer system 600 of a server adapted to implement the embodiments of the present disclosure is shown. The server shown in FIG. 6 is merely an example, and should not limit the function and scope of use of the embodiments of the present disclosure.

As shown in FIG. 6, the computer system 600 includes a Central Processing Unit (CPU) 601, which can execute various appropriate operations and processes based on programs stored in a Read Only Memory (ROM) 602 or programs loaded from a storage portion 608 to a Random Access Memory (RAM) 603. The RAM 603 also stores various programs and data required by operations of the system 600. The CPU 601, the ROM 602, and the RAM 603 are connected to each other through a bus 604. An Input/Output (I/O) interface 605 is also connected to the bus 604.

The following components are connected to the I/O interface 605: an input portion 606 including a keyboard, a mouse, or the like; an output portion 607 including a Cathode Ray Tube (CRT), a Liquid Crystal Display (LCD), a speaker, or the like; a storage portion 608 including a hard disk or the like; and a communication portion 609 including a network interface card, such as a Local Area Network (LAN) card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610 as required, so that a computer program read therefrom is installed on the storage portion 608 as required.

In particular, according to some embodiments of the present disclosure, the process described above with reference to the flowchart may be implemented in a computer software program. For example, an embodiment of the present disclosure includes a computer program product including a computer program loaded to a computer-readable medium, the computer program including a program code for executing the method shown in the flowchart. In such an embodiment, the computer program may be downloaded and installed from a network via the communication portion 609, and/or installed from the removable medium 611. When the computer program is executed by the CPU 601, the functions defined in the method of the embodiments of the present disclosure are executed. It should be noted that the computer-readable medium of the present disclosure may be a computer-readable signal medium or a computer-readable storage medium or a combination of the two. An example of the computer-readable storage medium may be, but is not limited to: electric, magnetic, optical, electromagnetic, infrared, or semiconductor systems, apparatuses, elements, or any combination of the above. A more specific example of the computer-readable storage medium may include but is not limited to: an electrical connection with one or more wires, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory, or any suitable combination of the above. In the present disclosure, the computer-readable storage medium may be any tangible medium containing or storing programs which may be used by an instruction execution system, apparatus or device or incorporated thereto. In the present disclosure, the computer-readable signal medium may include data signals in a baseband or propagated as parts of carriers, in which computer-readable program codes are carried. The data signals propagated may be in multiple forms, including but not limited to electromagnetic signals, optical signals or any appropriate combination of them. The computer-readable signal medium may also be any computer-readable medium beyond the computer-readable storage medium. The computer-readable medium is capable of sending, propagating or transmitting a program used by an instruction execution system, apparatus or device or a combination of them. The program codes included in the computer-readable medium may be transmitted by any appropriate medium, including but not limited to wireless, wired, optical cable, RF, etc., or any appropriate combination of them.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program codes may be completely executed on a user's computer, partially executed on a user's computer, executed as a separate software package, partially executed on a user's computer and partially executed on a remote computer, or completely executed on a remote computer or a server. In the circumstance involving a remote computer, the remote computer may be connected to a user's computer through any network, including a local area network (LAN) or a wide area network (WAN), or connected to an external computer (for example, connected through Internet using an Internet service provider).

The process diagrams and block diagrams in the drawings illustrate system architectures, functions and operations that may be implemented according to the systems, methods and computer program products of various embodiments of the present disclosure. In this regard, each box in the flowcharts or block diagrams may represent a module, a program segment, or a part of a code, which includes one or more executable instructions for implementing the specified logical functions. It should be noted that, in some alternative implementations, the functions marked in the boxes may also be implemented in an order different from that marked in the drawing. For example, two consecutive boxes substantially may be executed in parallel, or sometimes executed in a reverse order, depending on the involved functions. It should also be noted that, each box in the block diagrams and/or flowcharts, and a combination of boxes in the block diagrams and/or flowcharts may be implemented by a dedicated hardware-based system for executing specified functions or operations, or implemented by a combination of dedicated hardware and computer instructions.

The units involved in some embodiments of the present disclosure may be implemented by means of software or hardware. The described units may also be provided in a processor, for example, described as: a processor, including a first storage unit, a query unit, a first target participant determining unit, a first sending unit, and a first recording unit. Here, the names of these units do not in some cases constitute a limitation to such units themselves. For example, the first storage unit may also be described as "a unit configured to store the to-be-chained data into the distributed storage cluster".

In another aspect, the present disclosure further provides a computer-readable medium. The computer-readable storage medium may be included in the apparatus in the above described embodiments, or a stand-alone computer-readable medium not assembled into the apparatus. The computer-readable medium stores one or more programs. The one or more programs, when executed by the apparatus, cause the apparatus to: store, in response to a success in verification of a second chaining request received from a participant node, to-be-chained data into the distributed storage cluster; query, in the distributed storage cluster, respective participant information of a phase indicated by a participation phase identity of an project indicated by a participated project identity in the received second data chaining request; determine participant node identities in the queried participant information as a target participant node identity set; send to the consensus node the digest information of the to-be-chained data, the participant node identity of the participant node sending the received second data chaining request, the participated project identity and participation phase identity in the received second data chaining request, and the target participant node identity set as a third chaining request; and record a corresponding relationship between the to-be-chained data stored in the distributed storage cluster and the third chaining request sent to the consensus node.

The above description is only an explanation for the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functions.

What is claimed is:

1. A service flow system, comprising a management server, a distributed storage cluster and a block chain alliance network connected by a network, the block chain alliance network comprising a consensus node and at least one participant node, wherein:
a participant node is configured to:
in response to receiving a first chaining request comprising to-be-chained data, a participated project identity and a participation phase identity, send the first chaining request and participant authentication information of the participant node as a second data chaining request to the management server, the management server is configured to:
in response to a success in verification of the second data chaining request received from the participant node, store the to-be-chained data into the distributed storage cluster;
query, in the distributed storage cluster, respective participant information of a phase indicated by the participation phase identity of a project indicated by the participated project identity in the received second data chaining request and determine participant node identities in the respective participant information as a target participant node identity set;
send to the consensus node digest information of the to-be-chained data, a participant node identity of the participant node sending the received second data chaining request, the participated project identity and participation phase identity in the received second data chaining request, and the target participant node identity set as a third chaining request; and
record a corresponding relationship between the to-be-chained data stored in the distributed storage cluster and the third chaining request sent to the consensus node, the consensus node is configured to:
in response to receiving the third chaining request sent by the management server, store the received third chaining request to a local chaining request buffer pool;
select, according to a preset consensus algorithm, a request from the local chaining request buffer pool; and
send, for the selected request, data except the target participant node identity set in the selected request as a fourth chaining request to participant nodes indicated by respective participant node identities in the target participant node identity set in the selected request, the participant nodes are configured to:
in response to receiving the fourth chaining request sent by the consensus node, connect the fourth chaining request to local block chains of the participant nodes.

2. The system according to claim 1, wherein the management server is configured to, in response to a success in verification of the second data chaining request received from the participant node, store to-be-chained data to the distributed storage cluster, comprising:
the management server is configured to:
in response to a success in verification of participant authentication information in the second data chaining request received from the participant node, query in the distributed storage cluster to determine whether participant node identity corresponding to the received participant authentication information is in the participant node identities of the participant information of the phase indicated by the participation phase identity of the project indicated by the received participated project identity; and
in response to determining that the participant node identity corresponding to the received participant authentication information is in the participant node identities of the participant information of the phase indicated by the participation phase identity of the project indicated by the received participated project identity, determine that the second data chaining request received from the participant node succeeds in verification.

3. The system according to claim 2, wherein:
the management server is configured to:
in response to receiving a new project creating request comprising to-be-created project information, store the to-be-created project information to the distributed storage cluster, the to-be-created project information comprising an project identity of a to-be-created project and phase information, the phase information being of a number of project phases comprised in the project, the phase information comprising a phase identity and participant information, the participant information being of a number of participants participating in an project phase, and the participant information comprising a participant node identity;
determine participant node identities in participant information comprised in respective phase information of the to-be-created project information as a target participant node identity set;
send to the consensus node digest information of the to-be-created project information and the target participant node identity set as a third chaining request; and
record a corresponding relationship between the to-be-created project information stored in the distributed storage cluster and the third chaining request sent to the consensus node.

4. The system according to claim 3, wherein:
the participant node is configured to:
in response to a success in verification of an on-chain access request including a to-be-accessed on-chain data identity received from a terminal, query in the local block chain data corresponding to the to-be-accessed on-chain data identity to obtain found data, and send the found data to the terminal.

5. The system according to claim 1, wherein:
the management server is configured to:
in response to receiving an off-chain access request sent by a terminal and comprising a to-be-accessed off-chain data identity, a to-be-accessed project identity, a to-be-accessed phase identity and request access participant authentication information, query in the distributed storage cluster to determine whether participant node identity corresponding to received request participant authentication information is in participant node identities of respective participant information of a phase indicated by a to-be-accessed phase identity of a project indicated by the received to-be-accessed project identity; and
in response to determining that the participant node identity corresponding to the received request participant authentication information is in the participant node identities of the respective participant information of the phase indicated by the to-be-accessed phase identity of the project indicated by the received to-be-accessed project identity, query, in the distributed storage cluster, data corresponding to the to-be-accessed off-chain data identity to obtain queried data, and send the queried data to the terminal.

6. A service data processing method, applied to a management server in a service flow system, wherein the service flow system comprises the management server, a distributed storage cluster and a block chain alliance network connected by a network, the block chain alliance network comprises a consensus node and at least one participant node, and the method comprises:

in response to a success in verification of a second data chaining request received from a participant node, storing to-be-chained data into the distributed storage cluster;

querying, in the distributed storage cluster, respective participant information of a phase indicated by a participation phase identity of a project indicated by a participated project identity in the received second data chaining request;

determining participant node identities in the respective participant information as a target participant node identity set;

sending to the consensus node digest information of the to-be-chained data, a participant node identity of the participant node sending the received second data chaining request, the participated project identity and participation phase identity in the received second data chaining request, and the target participant node identity set as a third chaining request; and recording a corresponding relationship between the to-be-chained data stored in the distributed storage cluster and the third chaining request sent to the consensus node.

7. The method according to claim 6, wherein the in response to a success in verification of the second data chaining request received from a participant node comprises:

in response to a success in verification of participant authentication information in the second data chaining request received from the participant node, query in the distributed storage cluster to determine whether participant node identity corresponding to the received participant authentication information is in the participant node identities of the participant information of the phase indicated by the participation phase identity of the project indicated by the received participated project identity; and in response to determining that the participant node identity corresponding to the received participant authentication information is in the participant node identities of the participant information of the phase indicated by the participation phase identity of the project indicated by the received participated project identity, determining that the second data chaining request received from the participant node succeeds in verification.

8. The method according to claim 7, wherein the method further comprises:

in response to receiving a new project creating request comprising to-be-created project information, storing the to-be-created project information into the distributed storage cluster, the to-be-created project information comprising an project identity of a to-be-created project and phase information, the phase information being of a number of project phases comprised in the project, the phase information comprising a phase identity and participant information, the participant information being of a number of participants participating in an project phase, and the participant information comprising a participant node identity;

determining participant node identities in participant information comprised in respective phase information of the to-be-created project information as a target participant node identity set;

sending to the consensus node digest information of the to-be-created project information and the target participant node identity set as a third chaining request; and recording a corresponding relationship between the to-be-created project information stored in the distributed storage cluster and the third chaining request sent to the consensus node.

9. The method according to claim 6, wherein the method further comprises:

in response to receiving an off-chain access request sent by a terminal and comprising a to-be-accessed off-chain data identity, a to-be-accessed project identity, a to-be-accessed phase identity and request access participant authentication information, querying in the distributed storage cluster to determine whether participant node identity corresponding to received request participant authentication information is in participant node identities of respective participant information of a phase indicated by a to-be-accessed phase identity of a project indicated by the received to-be-accessed project identity; and in response to determining that the participant node identity corresponding to the received request participant authentication information is in the participant node identities of the respective participant information of the phase indicated by the to-be-accessed phase identity of the project indicated by the received to-be-accessed project identity, querying, in the distributed storage cluster, data corresponding to the to-be-accessed off-chain data identity to obtain queried data, and sending the queried data to the terminal.

10. A service data processing apparatus, applied to a management server in a service flow system, wherein the service flow system comprises the management server, a distributed storage cluster and a block chain alliance network connected by a network, the block chain alliance network comprises a consensus node and at least one participant node, and the apparatus comprises:

at least one processor; and a memory storing instructions, the instructions when executed by the at least one processor, cause the at least one processor to perform operations, the operations comprising:

in response to a success in verification of a second data chaining request received from a participant node, storing to-be-chained data into the distributed storage cluster;

querying, in the distributed storage cluster, respective participant information of a phase indicated by a participation phase identity of a project indicated by a participated project identity in the second data chaining request;

determining participant node identities in the respective participant information as a target participant node identity set;

sending to the consensus node digest information of the to-be-chained data, a participant node identity of the participant node sending the received second data chaining request, the participated project identity and participation phase identity in the received second data chaining request, and the target participant node identity set as a third chaining request; and recording a corresponding relationship between the to-be-chained data stored in the distributed storage cluster and the third chaining request sent to the consensus node.

11. The apparatus according to claim 10, wherein the in response to a success in verification of the second data chaining request received from a participant node comprises:

in response to a success in verification of participant authentication information in the second data chaining request received from the participant node, query in the distributed storage cluster to determine whether participant node identity corresponding to the received participant authentication information is in the participant node identities of the participant information of the phase indicated by the participation phase identity of the project indicated by the received participated project identity; and in response to determining that the participant node identity corresponding to the received participant authentication information is in the participant node identities of the participant information of the phase indicated by the participation phase identity of the project indicated by the received participated project identity, determining that the second data chaining request received from the participant node succeeds in verification.

12. The apparatus according to claim 11, wherein the operations further comprise:

in response to receiving a new project creating request comprising to-be-created project information, storing the to-be-created project information into the distributed storage cluster, the to-be-created project information comprising an project identity of a to-be-created project and phase information, the phase information being of a number of project phases comprised in the project, the phase information comprising a phase identity and participant information, the participant information being of a number of participants participating in an project phase, and the participant information comprising a participant node identity;

determining participant node identities in participant information comprised in respective phase information of the to-be-created project information as a target participant node identity set;

sending to the consensus node digest information of the to-be-created project information and the target participant node identity set as a third chaining request; and recording a corresponding relationship between the to-be-created project information stored in the distributed storage cluster and the third chaining request sent to the consensus node.

13. The apparatus according to claim 10, wherein the operations further comprise:

in response to receiving an off-chain access request sent by a terminal and comprising a to-be-accessed off-chain data identity, a to-be-accessed project identity, a to-be-accessed phase identity and request access participant authentication information, querying in the distributed storage cluster to determine whether participant node identity corresponding to received request participant authentication information is in participant node identities of respective participant information of a phase indicated by a to-be-accessed phase identity of a project indicated by the received to-be-accessed project identity; and in response to determining that the participant node identity corresponding to the received request participant authentication information is in the participant node identities of the respective participant information of the phase indicated by the to-be-accessed phase identity of the project indicated by the received to-be-accessed project identity, querying, in the distributed storage cluster, data corresponding to the to-be-accessed off-chain data identity to obtained queried data, and send the queried data to the terminal.

14. A non-transitory computer-readable storage medium, storing a computer program thereon, wherein the computer program, when executed by one or more processors, causes the processors to implement operations applied to a management server in a service flow system, wherein the service flow system comprises the management server, a distributed storage cluster and a block chain alliance network connected by a network, the block chain alliance network comprises a consensus node and at least one participant node, and the operations comprise:

in response to a success in verification of a second data chaining request received from a participant node, storing to-be-chained data into the distributed storage cluster;

querying, in the distributed storage cluster, respective participant information of a phase indicated by a participation phase identity of a project indicated by a participated project identity in the second data chaining request;

determining participant node identities in the respective participant information as a target participant node identity set;

sending to the consensus node digest information of the to-be-chained data, a participant node identity of the participant node sending the received second data chaining request, the participated project identity and participation phase identity in the received second data chaining request, and the target participant node identity set as a third chaining request; and recording a corresponding relationship between the to-be-chained data stored in the distributed storage cluster and the third chaining request sent to the consensus node.

15. The medium according to claim 14, wherein in response to a success in verification of the second data chaining request received from a participant node comprises:

in response to a success in verification of participant authentication information in the second data chaining request received from the participant node, query in the distributed storage cluster to determine whether participant node identity corresponding to the received participant authentication information is in the participant node identities of the participant information of the phase indicated by the participation phase identity of the project indicated by the received participated project identity; and in response to determining that the participant node identity corresponding to the received participant authentication information is in the participant node identities of the participant information of the phase indicated by the participation phase identity of the project indicated by the received participated project identity, determining that the second data chaining request received from the participant node succeeds in verification.

16. The medium according to claim 15, wherein the operations further comprise:

in response to receiving a new project creating request comprising to-be-created project information, storing the to-be-created project information into the distributed storage cluster, the to-be-created project information comprising an project identity of a to-be-created project and phase information, the phase information being of a number of project phases comprised in the project, the phase information comprising a phase identity and participant information, the participant information being of a number of participants participating in an project phase, and the participant information comprising a participant node identity;

determining participant node identities in participant information comprised in respective phase information of the to-be-created project information as a target participant node identity set;

sending to the consensus node digest information of the to-be-created project information and the target participant node identity set as a third chaining request; and recording a corresponding relationship between the to-be-created project information stored in the distributed storage cluster and the third chaining request sent to the consensus node.

17. The medium according to claim 14, wherein the operations further comprise:

in response to receiving an off-chain access request sent by a terminal and comprising a to-be-accessed off-chain data identity, a to-be-accessed project identity, a to-be-accessed phase identity and request access participant authentication information, querying in the distributed storage cluster to determine whether participant node identity corresponding to received request participant authentication information is in participant node identities of respective participant information of a phase indicated by a to-be-accessed phase identity of a project indicated by the received to-be-accessed project identity; and in response to determining that the participant node identity corresponding to the received request participant authentication information is in the participant node identities of the respective participant information of the phase indicated by the to-be-accessed phase identity of the project indicated by the received to-be-accessed project identity, querying, in the distributed storage cluster, data corresponding to the to-be-accessed off-chain data identity to obtain queried data, and sending the queried data to the terminal.

* * * * *